INVENTOR.
LOREN J. O'BRIEN
BY Walter E. Pavlick
ATTORNEY

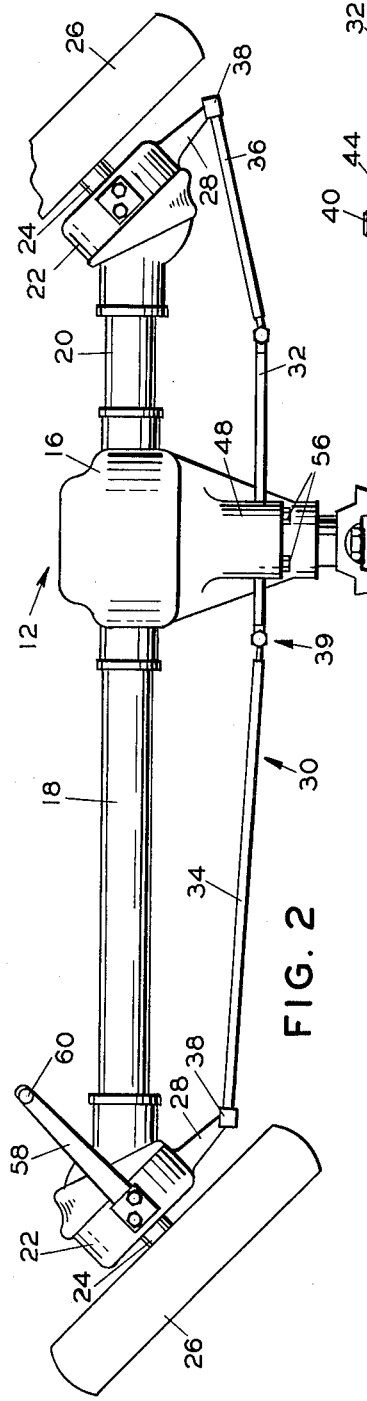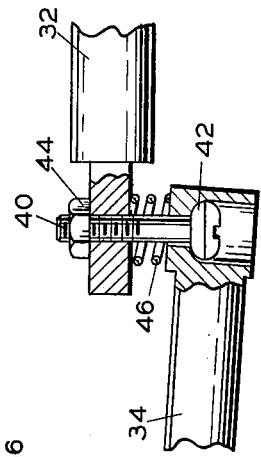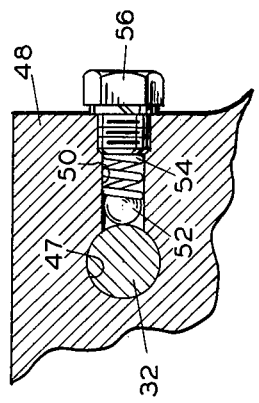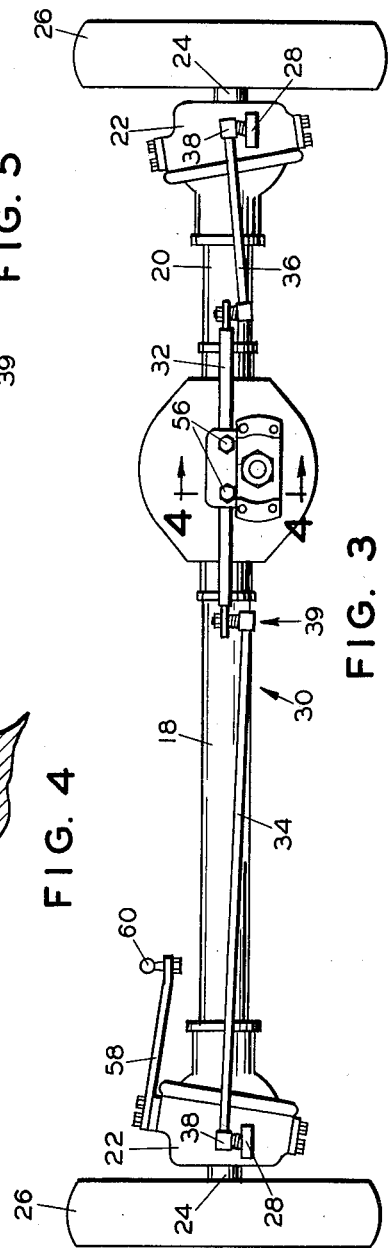
INVENTOR.
LOREN J. O'BRIEN

United States Patent Office 3,048,232
Patented Aug. 7, 1962

3,048,232
THREE PIECE TIE ROD ASSEMBLY FOR STEERING DRIVEN WHEELS
Loren J. O'Brien, R.R. 1, Grabill, Ind.
Filed Jan. 29, 1960, Ser. No. 5,542
8 Claims. (Cl. 180—43)

This invention relates to steering mechanisms and more particularly to a three piece tie rod assembly therefor.

Conventional tie rod assemblies for the steering wheels of a vehicle have included a one piece tie rod which extends horizontally and is pivotally connected at its ends to the knuckle arms of the wheel assemblies. With this arrangement upon movement of a steering arm to rotate the wheel knuckle, the tie rod not only moves in an axial direction but also has translatory motion in the forward and rearward direction relative to the vehicle. Even in the few instances where three piece tie rods have been employed, the central member thereof is movable in a forward and rearward direction.

It is desirable particularly with front axles to arrange the tie rod to the rear of the axle to improve the steering geometry and also so that the axle may act as a shield to prevent damage to a less strongly constructed tie rod. However, due to the restricted clearance to the rear of the axle and the vast operational space required by the tie rod, this has not generally been possible.

Furthermore, in an attempt to eliminate shimmying or vibration in the steering mechanism, anti-shimmying devices, requiring additional space, have been provided on the tie rod.

An object of this invention is to position the steering assembly tie rod to the rear of the axle.

Another object of this invention is to reduce the forward and rearward operational space required by the tie rod.

Another object of this invention is to provide a compact tie rod arrangement having anti-shimmying means forming a part thereof.

A further object of this invention is to improve the steering geometry by providing a structure in which the outer tie rod ends can be placed directly on the ideal steering centerline.

A specific object of this invention is to provide a three piece tie rod to the rear of a front axle, the central member of the tie rod being slidably mounted in the front axle differential case for lateral movement in the axial direction only thereby reducing the operational space requirement for the tie rod. Additionally, an anti-shimmying device is provided on the tie rod at the differential case.

These and other objects and advantages of this invention will become apparent from the following detailed description, which constitutes one preferred embodiment of this invention, when taken in connection with the accompanying drawings wherein:

FIG. 2 is a plan view of the front axle and tie rod assemblies illustrated in FIG. 1 showing the assemblies in vehicle turning position;

FIG. 3 is a rear elevational view of the structure disclosed in FIG. 2 showing the straightaway driving position;

FIG. 4 is a detail view taken on line 4—4 of FIG. 3; and

FIG. 5 is a detail view of the universal connection between the respective tie rod members.

Figure 1:
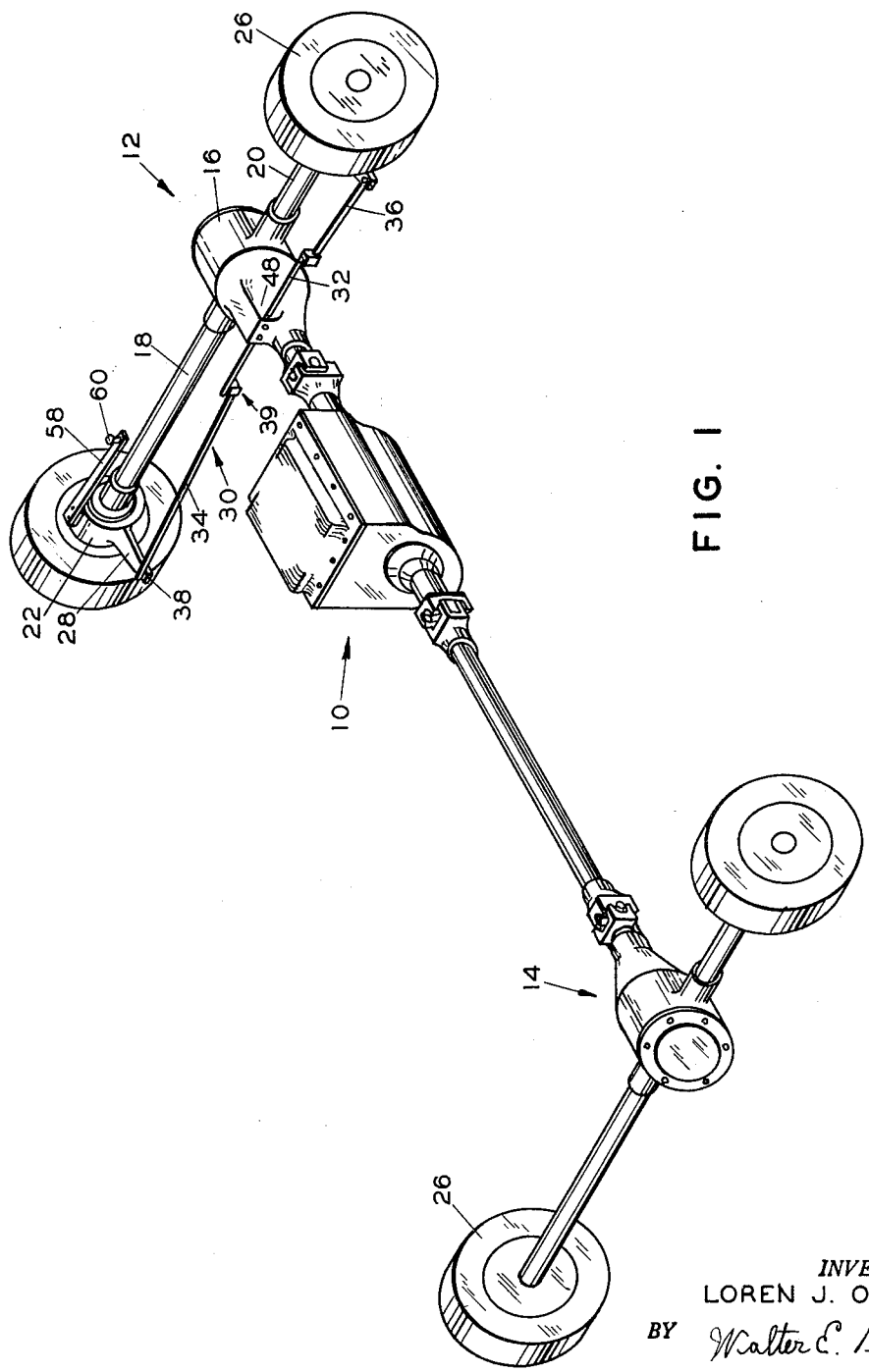
FIG. 1 is a perspective view of the tie rod assembly illustrating its use in a vehicle.

For purposes of illustration, the present invention is embodied in a four wheel drive vehicle. Thus, FIG. 1 discloses a power transfer gear case 10 for driving a front axle assembly 12 and a rear axle assembly 14. The front axle assembly 12 comprises a differential case 16 having front axle shafts 18 and 20 extending outwardly in opposite directions from the front portion thereof. Each axle shaft 18 and 20 is provided at its outwardly extending end with the usual wheel knuckle 22. The wheel knuckles 22 are provided with a conventional spindle 24 upon which a wheel 26 of the vehicle is rotatably mounted. A knuckle arm 28 extends rearwardly in a horizontal plane from each wheel knuckle 22 and is adapted to receive the ends of a three piece tie rod assembly indicated generally at 30.

The three piece tie rod assembly 30 comprises a central or tie member 32 and a pair of drag link or end members 34 and 36. The drag link member 36 is here shown as being shorter in length than drag link member 34; however, such is not a feature of this invention but is merely provided to adapt the invention to the illustrated application. The outermost ends of the drag link members 34 and 36 are pivotally connected to the rear of knuckle arms 28 at 38.

The innermost ends of drag link members 34 and 36 extend beneath the ends of the central tie member 32 (as best shown in FIG. 3). These overlapping ends of the central tie member 32 and the drag link members 34 and 36 are also pivotally connected by any suitable means 39, such as here shown wherein a screw 40 having a partially spherical member 42 on an end thereof extends through the overlapping ends of the members and is secured in place by nut 44. The drag link members 34 and 36 are provided with socket portions to accommodate these spherical members 42. A small coil spring 46 is disposed around the screw 40 and is compressed between the overlapping ends of the central tie member 32 and its corresponding connected drag link member 34 or 36 so that a limited amount of relative vertical movement may take place between the connected members.

The central portion of the tie member 32 is received in a transversely extending aperture 47 provided in the rear portion 48 of differential case 16. It should be pointed out that this transversely extending aperture is only slightly larger in diameter than the diameter of the central tie member 32. As a result, the central tie member is laterally slidable within the differential case but is restrained from forward and rearward movement relative to the case.

To dampen shimmy in the steering assembly, drag or anti-shimmy means is provided on the central tie member 32. To this end, the rear portion 48 of the differential case 16 is provided with a pair of longitudinally extending apertures 50 which communicate with the tie member receiving transverse aperture 47. A ball member 52 is provided in each aperture 50 and is biased against the central tie member 32 by a coil spring 54. The coil springs 54 are held in place by cap screws 56 which are threadedly received in the outer portion of the apertures 50.

To effect rotation of the wheels 26 and thus steering of the vehicle, a steering arm 58 extends inwardly from the top portion of one of the wheel knuckles 22. The inner end of the steering arm is provided with a ball joint member 60 for connection to a pitman arm (not shown) which is controlled by an appropriate steering gear mechanism (not shown).

In operation, upon actuation by the steering gear mechanism, steering arm 58 rotates wheel knuckle 22, spindle 24 and consequently wheel 26. Since knuckle arm 28 rotates with the wheel knuckle 22 both front wheels are steered in unison by means of the three piece tie rod assembly 30. Since the central tie member 32 is restrained against backward and forward movement relative to the differential case 16, the drag link members 34 and 36 will pivot about connections 38 and 39 to assume the position illustrated in FIG. 2.

With the present invention, the tie rod assembly need not be positioned completely behind the differential case 16 but may be mounted therein and also the operational space for the tie rod is reduced. Furthermore, an antishimmying device has been provided on the tie rod without an increase in space requirements. Since the tie rod is positioned to the rear of the axle, the outermost ends of the tie rod assembly 30 can be placed on the ideal steering centerline, i.e., on a line drawn between the midpoint of the rear axle and the king pin of a wheel assembly, thus improving the steering geometry.

While only a single embodiment of this invention has been shown and described, it is apparent that there may be many changes in structure as well as operation without departing from the scope of this invention as defined by the appended claims.

I claim:

1. In a vehicle having an axle, a tie rod for a steering assembly comprising a center member having end members pivotally connected thereto, said end members being disposed externally of said axle, and means mounting said center member to the rear portion of the axle for lateral movement only.

2. In a vehicle having an axle, a three piece tie rod for a steering assembly comprising a center member having end members pivotally connected thereto, said end members being disposed externally of said axle, and means mounting said three piece tie rod to the rear portion of said axle, said means restraining forward and rearward movement of a member of said tie rod assembly relative to the vehicle.

3. In a vehicle a differential case having axle shafts extending therefrom, a three piece tie rod for a steering assembly comprising a center member having end members pivotally connected thereto, said end members being external of said differential case and axle shafts, said differential case mounting the center member of said three piece tie rod for lateral movement only.

4. In a vehicle a differential case having axle shafts extending therefrom, a three piece tie rod for a steering assembly comprising a center member having end members pivotally connected thereto, at least one of said end members being disposed externally of said gear case and axle shafts, said differential case mounting said center member for lateral movement only.

5. In a vehicle the combination comprising a differential case having axle shafts extending therefrom, a three piece tie rod for a steering assembly including a center member having end members pivotally connected thereto, said three piece tie rod being positioned to the rear of said axle shafts, said differential case restraining movement of said center member whereby said center member is movable in a lateral direction only.

6. The combination of claim 5 including drag means provided on said center member at said differential case to dampen shimmy in the steering assembly.

7. In a vehicle the combination comprising a differential case having axle shafts extending therefrom, a three piece tie rod for a steering assembly including a center member having end members pivotally connected to the ends thereof, said end members being external of said axle shafts, said center member having a portion thereof mounted in said differential case whereby said differential case restrains forward and rearward movement thereof relative to the case, and drag means in said differential case operable on said center member to dampen shimmy of said tie rod.

8. In a vehicle the combination comprising a differential case having axle shafts extending therefrom, a pair of steerable ground wheels operably associated with said axle shafts, a three piece tie rod for a steering assembly including an elongated center member defining a pair of ends, and an end member pivotally connected to each end of said center member, said end members being external of said axle shafts and operably associated with said ground wheels, said center member having a portion thereof received in said differential case mounting said center member for lateral movement only, and resilient means mounted in said case and operable on said center member to dampen shimmy of said tie rod.

References Cited in the file of this patent

UNITED STATES PATENTS

| | | |
|---|---|---|
| 1,485,529 | Rempe | Mar. 4, 1924 |
| 1,738,147 | Moller | Dec. 3, 1929 |
| 2,075,085 | Paton | Mar. 30, 1937 |
| 2,349,151 | Farnsworth | May 16, 1944 |
| 2,941,611 | Norrie | June 21, 1960 |